(12) United States Patent
Li

(10) Patent No.: US 11,062,140 B2
(45) Date of Patent: Jul. 13, 2021

(54) DISPLAY METHOD, ELECTRONIC DEVICE AND STORAGE MEDIUM HAVING THE SAME

(71) Applicant: Lenovo (Beijing) Co., Ltd., Beijing (CN)

(72) Inventor: Fanzhi Li, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/370,725

(22) Filed: Mar. 29, 2019

(65) Prior Publication Data

US 2019/0303673 A1 Oct. 3, 2019

(30) Foreign Application Priority Data

Mar. 30, 2018 (CN) .................. 201810275387.X

(51) Int. Cl.
*G06K 9/00* (2006.01)
*G02B 27/01* (2006.01)
(Continued)

(52) U.S. Cl.
CPC ..... *G06K 9/00671* (2013.01); *G02B 27/0172* (2013.01); *G06F 3/013* (2013.01); *G06F 3/04842* (2013.01); *G06K 9/6253* (2013.01); *G02B 2027/014* (2013.01); *G02B 2027/0138* (2013.01); *G02B 2027/0178* (2013.01)

(58) Field of Classification Search
CPC ........ A61B 2562/02; A61B 2562/0219; A61B 2562/0223; A61B 2562/0247; A61B 2562/043; A61B 5/0015; A61B 5/0022; A61B 5/0077; A61B 5/01; A61B 5/024; A61B 5/0261; A61B 5/1113; A61B 5/1114; A61B 5/113; A61B 5/14551; A61B 5/447; A61B 5/4815; A61B 5/4818; A61B 5/6801; A61B 5/6843; A61B 5/6891; A61B 5/7275; A61B 5/742; A61B 7/00; A61B 2019/5291; A61B 2090/365; A61G 2203/42; A61G 2203/46; A61G 7/057; G06K 9/00664–00704; G06K 9/00671; G06T 2215/16; G06T 19/006; H04N 2201/3245; G06F 3/011–015; A63F 2300/8082; G05B 2219/32014; G05B 2219/39449; G05B 2219/39451; G05B 2219/32246; G05B 2219/36432; G05B 2219/40131; G05D 1/0038; G05D 1/0044; H04M 2203/359; H04L 29/06034; H04L 67/38
See application file for complete search history.

(56) References Cited

U.S. PATENT DOCUMENTS 8,170,971 B1 * 5/2012 Wilson ............... G06N 3/02
706/46
8,350,686 B2 * 1/2013 Inoue ............... G01C 21/36
340/435

(Continued)

*Primary Examiner* — Abderrahim Merouan
(74) *Attorney, Agent, or Firm* — Anova Law Group, PLLC

(57) ABSTRACT

A display method is provided. The method includes: acquiring media data within a collection range of a first acquisition device; determining a target object associated with the media data; determining associated data corresponding to the target object; and outputting the associated data corresponding to the target object to a user.

20 Claims, 11 Drawing Sheets

(51) Int. Cl.
*G06F 3/01* (2006.01)
*G06F 3/0484* (2013.01)
*G06K 9/62* (2006.01)

(56) References Cited

U.S. PATENT DOCUMENTS

| | | | | |
|---|---|---|---|---|
| 9,678,342 B2* | 6/2017 | Yamamoto | H04M 1/72563 |
| 9,921,073 B2* | 3/2018 | Rhee | G01C 21/3644 |
| 10,297,062 B2* | 5/2019 | Yajima | G02B 27/0172 |
| 10,571,145 B2* | 2/2020 | Miyaura | F24F 11/30 |
| 2010/0225756 A1* | 9/2010 | Miyata | G01C 21/3647 |
| | | | | 348/116 |
| 2010/0268451 A1* | 10/2010 | Choi | G01C 21/3679 |
| | | | | 701/533 |
| 2012/0092507 A1* | 4/2012 | Jung | H04N 5/23293 |
| | | | | 348/207.1 |
| 2012/0092528 A1* | 4/2012 | Jung | G06T 11/60 |
| | | | | 348/239 |
| 2012/0194551 A1* | 8/2012 | Osterhout | G06F 3/011 |
| | | | | 345/633 |
| 2013/0194164 A1* | 8/2013 | Sugden | G06F 3/167 |
| | | | | 345/8 |
| 2013/0288719 A1* | 10/2013 | Alonzo | H04W 4/026 |
| | | | | 455/457 |
| 2014/0139551 A1* | 5/2014 | McCulloch | G09G 5/377 |
| | | | | 345/633 |
| 2014/0237366 A1* | 8/2014 | Poulos | G06F 3/013 |
| | | | | 715/728 |
| 2015/0220835 A1* | 8/2015 | Wilson | G06Q 30/0282 |
| | | | | 706/46 |
| 2015/0268473 A1* | 9/2015 | Yajima | G02B 27/0172 |
| | | | | 345/633 |
| 2015/0278211 A1* | 10/2015 | Voronel | G06F 16/24578 |
| | | | | 707/728 |
| 2015/0379892 A1* | 12/2015 | Sako | G06K 9/72 |
| | | | | 434/127 |
| 2016/0005329 A1* | 1/2016 | Sako | G16H 20/60 |
| | | | | 434/127 |
| 2016/0027216 A1* | 1/2016 | da Veiga | G06F 3/0484 |
| | | | | 345/419 |
| 2016/0033770 A1* | 2/2016 | Fujimaki | H04N 13/344 |
| | | | | 345/8 |
| 2016/0162913 A1* | 6/2016 | Linden | G06Q 30/0202 |
| | | | | 705/7.31 |
| 2016/0209916 A1* | 7/2016 | Sendai | G02B 27/017 |
| 2016/0259977 A1* | 9/2016 | Asbun | A61B 5/1112 |
| 2016/0274358 A1* | 9/2016 | Yajima | G02B 27/0093 |
| 2016/0296152 A1* | 10/2016 | Shepherd | A61B 5/0476 |
| 2017/0024656 A1* | 1/2017 | Gilon | G16H 10/60 |
| 2017/0308340 A1* | 10/2017 | Roberts | H04N 1/00923 |
| 2018/0292952 A1* | 10/2018 | Norman | G06F 3/04883 |
| 2018/0329604 A1* | 11/2018 | Nakabo | G06T 13/40 |
| 2018/0349818 A1* | 12/2018 | Chan | G06Q 10/0639 |
| 2018/0367668 A1* | 12/2018 | Balzer | G10L 15/26 |
| 2019/0102793 A1* | 4/2019 | Krishnamurthy | G06Q 30/0255 |

* cited by examiner

DISPLAY METHOD, ELECTRONIC DEVICE AND STORAGE MEDIUM HAVING THE SAME

CROSS-REFERENCE TO RELATED APPLICATION

This application claims the priority to Chinese Patent Application No. 201810275387.X, entitled "DISPLAY METHOD, ELECTRONIC DEVICE AND STORAGE MEDIUM HAVING THE SAME," filed on Mar. 30, 2018, the entire content of which is incorporated herein by reference.

TECHNICAL FIELD

The present disclosure relates to display technologies for images, and in particular, to a display method, and an electronic device and a storage medium thereof.

BACKGROUND

When an image is being displayed, the camera and the sensors may collect the video or image of a real scene, then enhance recognizable objects in the video or image, and finally display an image combining real and virtual images. With increased use and development of image databases and maturing cloud computing technology, increased number of objects in captured videos and images may be identified. In relevant art, all identified objects may be enhanced, and the enhanced images of all objects may be displayed. Since many objects may need to be enhanced, during the calculation process, a large portion of the memory of the electronic device performing the computation may be occupied, thus reducing its operating speed. Further, when all the enhanced objects are displayed in the image too much picture content may cause the image to be confusing.

SUMMARY

In an aspect of the present disclosure, a display method is provided. The method includes: acquiring media data within a collection range of a first acquisition device; determining a target object associated with the media data; determining associated data corresponding to the target object; and outputting the associated data corresponding to the target object to a user.

In certain embodiments, the process of determining the target object associated with the media data includes: acquiring visual data collected by a second acquisition device, the visual data characterizing at least one of: a user orientation, a user field of view, and a user line of sight; determining visual focus data according to the visual data; and identifying an object associated with the media data that matches the visual focus data as the target object.

In certain embodiments, the process of determining the target object associated with the media data includes: acquiring scene data, the scene data representing a scene in which the user is located; determining potential focus data according to the scene data; and identifying an object associated with the media data that matches the potential focus data as the target object.

In certain embodiments, the process of determining the target object associated with the media data includes: acquiring historical data, the historical data characterizing the user's interest; determining potential focus data according to the historical data; and identifying an object associated with the media data that matches the potential focus data as the target object.

In certain embodiments, the process of determining the target object associated with the media data includes: determining a plurality of candidate objects associated with the media data, the candidate objects being objects having associated data; and determining the target object from the candidate objects.

In certain embodiments, the process of determining the target object associated with the media data includes: determining target data associated with the media data, the target data being partial data of the media data; and determining the target object according to the target data.

In certain embodiments, the process of determining the associated data corresponding to the target object includes: acquiring a list of attributes of the target object; identifying an attribute satisfying a first condition from the list of attributes; and determining associated data corresponding to the identified attribute as the associated data corresponding to the target object.

In certain embodiments, the display method further includes: determining a list of additional objects associated with the media data; determining a to-be-displayed object that satisfies a second condition from the list of additional objects; outputting a prompt message to inquire whether to display associated data of the to-be-displayed object; and outputting the associated data of the to-be-displayed object with the associated data of the target object when receiving an affirmative answer to the prompt message.

In another aspect of the present disclosure, an electronic device is provided. The electronic device includes: a memory configured to store a set of instructions; and a processor configured to execute the set of instructions to perform: acquiring media data within a collection range of a first acquisition device; determining a target object associated with the media data; determining associated data corresponding to the target object; and outputting the associated data corresponding to the target object to a user.

In certain embodiments, the processor is further to perform: acquiring visual data collected by a second acquisition device, the visual data characterizing at least one of: a user orientation, a user field of view, and a user line of sight; determining visual focus data according to the visual data; and identifying an object associated with the media data that matches the visual focus data as the target object.

In certain embodiments, the processor is further to perform: acquiring scene data, the scene data representing a scene in which the user is located; determining potential focus data according to the scene data; and identifying an object associated with the media data that matches the potential focus data as the target object.

In certain embodiments, the processor is further to perform: acquiring historical data, the historical data characterizing the user's interest; determining potential focus data according to the historical data; and identifying an object associated with the media data that matches the potential focus data as the target object.

In certain embodiments, the processor is further to perform: determining a plurality of candidate objects associated with the media data, the candidate objects being objects having associated data; and determining the target object from the candidate objects.

In certain embodiments, the processor is further to perform: determining target data from the media data, the target data being partial data of the media data; and determining the target object according to the target data.

In another aspect of the present disclosure, an electronic device is provided. The electronic device includes: a first acquisition device configured to collect media data; a processor, configured to determine a target object associated with the media data, and determine associated data corresponding to the target object; and a display device configured to output the associated data corresponding to the target object to a user.

In certain embodiments, in the forgoing electronic device, the display device comprises a viewable area having a light transmittance greater than or equal to a transmittance threshold; and the display device is configured to display the associated data corresponding to the target object.

In certain embodiments, in the forgoing electronic device, the display device comprises a viewable area having a light transmittance less than a transmittance threshold; and the display device is configured to display the media data and the associated data corresponding to the target object.

In certain embodiments, in the forgoing electronic device, the electronic device further comprises a second acquisition device configured to collect visual data, the visual data characterizing at least one of: a user orientation, a user field of view, and a user line of sight; and the processor is configured to determine the target object according to the visual data.

In certain embodiments, the electronic device further includes a holding device for maintaining a relative positional relationship between the electronic device and a portion of the user's body.

In certain embodiments, in the forgoing electronic device, the holding device is a head-mounted holder that maintains a relative positional relationship between the electronic device and the user's head, so that a viewable area is within a line of sight of the user, and the line of sight of the user is located within a collection range of sensors of the second acquisition device.

The above aspects will be explained in detail with accompanying drawings.

BRIEF DESCRIPTION OF THE DRAWINGS

In order to more clearly illustrate the technical solutions provided by the present disclosure, the drawings used in the description of the embodiments will be briefly described below. In the drawings (not necessarily to scale), similar reference labels may represent similar components across different drawings. Similar reference labels with different letter suffixes may indicate different examples of similar components.

DETAILED DESCRIPTION OF THE EMBODIMENTS

Technical solutions of the present disclosure will be described with reference to the accompanying drawings. The specific embodiments described herein are merely illustrations of the disclosure and are not intended to be limiting.

In the following description, the use of suffixes such as "module", "component" or "unit" for indicating an element is merely an explanation for facilitating the present disclosure, and has no specific meaning per se. Therefore, "module", "component" or "unit" may be used in combination.

An electronic device may be implemented in various forms. For example, the electronic devices described in the present disclosure may include mobile electronic devices such as Personal Digital Assistants (PDAs), navigation devices, wearable devices, and fixed electronic devices such as digital TVs, desktop computers, and so on.

In the following description, a mobile electronic device is taken as an example. Those skilled in the art will understand that the configuration according to the embodiments of the present disclosure may also be applied to a fixed type of electronic device, except for components specifically for mobile purposes.

Figure 1:
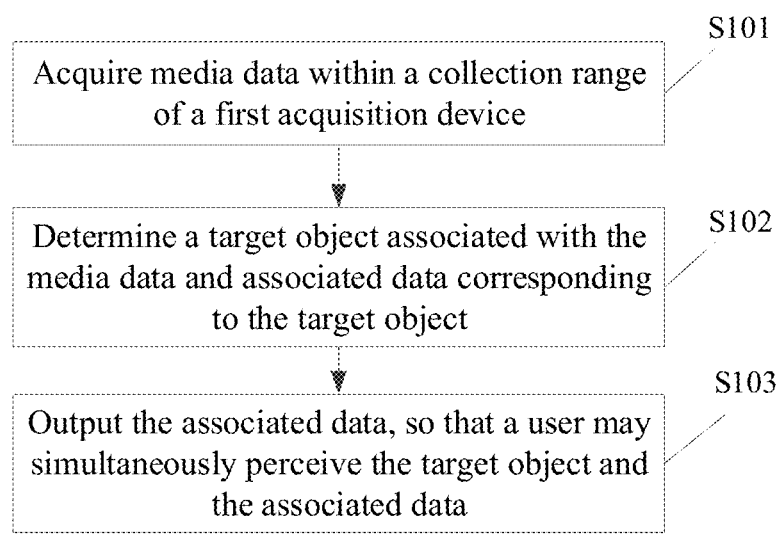
FIG. 1 is a schematic flowchart of a display method according to an embodiment of the present disclosure.

The present disclosure provides a display method according to certain embodiments. FIG. 1 is a schematic flowchart of a display method according to certain embodiments. As shown in FIG. 1, the method may be applied to an electronic device, and may include the following steps.

In Step S101, the electronic device may acquire media data within a collection range of a first acquisition device. The method may be applied to an electronic device. The electronic device may include a first acquisition device. The first acquisition device may be a camera of the electronic device for photographing objects within a field of view of human eyes. For example, the first acquisition device may be a rear camera of the electronic device, and media data in the collection range of the first acquisition device may be an image in front of a user's line of sight collected by the rear camera. The first acquisition device may also be a front camera of the electronic device, and the user faces the back of the electronic device. Thus the media data in the collection range of the first acquisition device is the image in front of the user's line of sight collected by the front camera. The media data may include all objects in the image collected by the first acquisition device, such as objects in a real scene, trees, pedestrians, buildings, etc., and may also be objects in a video.

In Step S102, the electronic device may determine a target object associated with the media data and associated data corresponding to the target object. The process of determining the target object associated with the media data and the associated data corresponding to the target object may include processing the media data by the electronic device to determine a target object associated with the media data and the data associated with the target object. It may also include sending the target object associated with the media data and the associated data corresponding to the target object to other devices (such as servers) through a network, and then receiving the results.

In certain embodiments, the associated data may be supplementary information associated with the target object. The associated data corresponding to the target object may be understood as the target object supplementary information acquired by enhancing the target object. That is, information associated with the target image is referred to as the associated data corresponding to the target object. For example, the target object may be a building under construction, and the associated data corresponding to the building may be a hard hat or the like displayed on the head of a pedestrian walking on the building.

The target object may be a part of a plurality of candidate objects associated with the media data that may have corresponding associated data. A candidate object is an object having corresponding associated data in the media data. For example, the captured image may be a street image, and the media data may include: a building, a tree, a trash can, a pedestrian or a flower, etc. The building, the tree, and the flower having corresponding associated data among the media data are automatically used as candidates, and a neural network algorithm may be used to estimate a part of the objects that the user desires to see as the target object.

In Step S103, the electronic device may output the associated data, so that a user may simultaneously perceive the target object and the associated data. In certain embodiments, the process in Step S103 may be understood as enabling the user to simultaneously view the associated data corresponding to the target object and the target object on the same screen. For example, the target object may be a store, the associated data of the store may be the business hours or marketing scope of the store, etc. When the associated data of the store is outputted to a user, the associated data of the store may be displayed next to the store, or may be placed above and near the store, allowing the user to see the store and the store's associated data on the same screen.

In certain embodiments, the electronic device may first acquire media data in the collection range of the first acquisition device. Next, the electronic device may determine the target object associated with the media data and the associated data corresponding to the target object. The target object may be a part of a plurality of candidate objects associated with the media data that may have corresponding associated data. Finally, the electronic device may output the associated data, so that a user may simultaneously perceive the target object and the associated data. Thus, only the data associated with the objects that the user wished to see is displayed, making the displayed picture tidier and more targeted, and thus enhancing the user experience.

Figure 2:
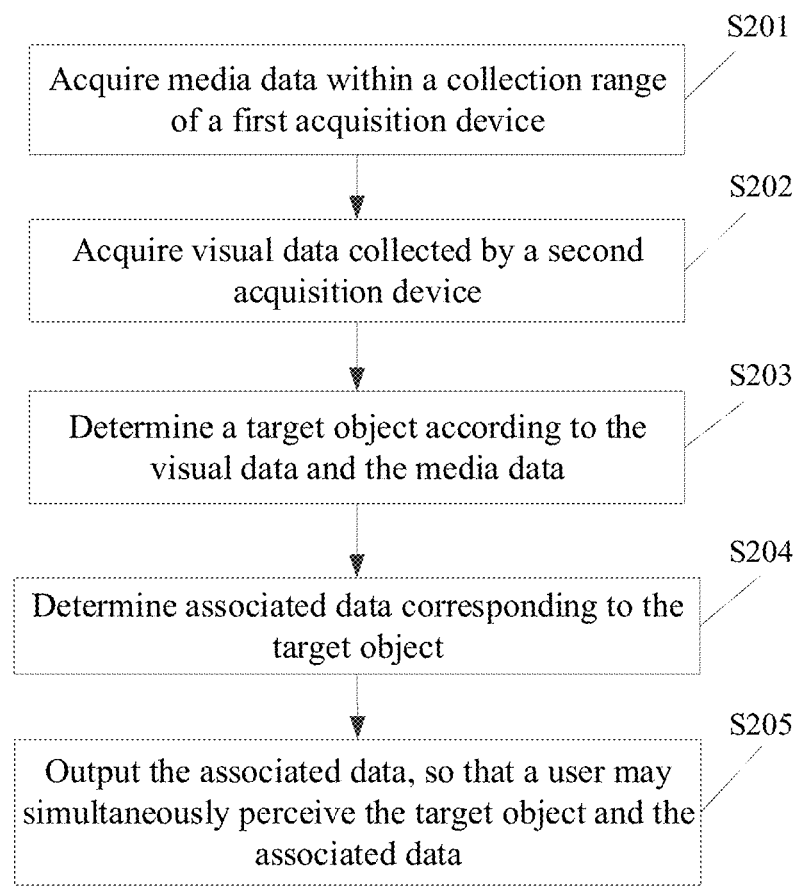
FIG. 2 is a schematic flowchart of a display method according to another embodiment of the present disclosure.

FIG. 2 is a schematic flowchart of a display method according to certain other embodiments of the present disclosure. The method may be applied to an electronic device. As shown in FIG. 2, the method may include the following steps.

In Step S201, the electronic device may acquire media data within a collection range of a first acquisition device. In certain embodiments, the method may be applied to an electronic device. The electronic device may include a first acquisition device and a second acquisition device. The first acquisition device may be a camera of the electronic device for acquiring objects within a field of view of a human eye. For example, the first acquisition device may be a rear camera of the electronic device, and the second acquisition device may be a front camera of the electronic device. The first acquisition device may collect media data within the collection range, that is, images in front of a user's line of sight collected by the rear camera. The first acquisition device may also be a front camera of the electronic device, and second acquisition device may be the rear camera of the electronic device. The user faces the back of the electronic device, then the media data in the collection range of the first acquisition device is the image in front of the user's line of sight collected by the front camera. The media data may include all objects in the image collected by the first acquisition device, such as objects in a real scene, trees, pedestrians, buildings, etc., and may also be objects in a video.

In Step S202, the electronic device may acquire visual data collected by a second acquisition device. In certain embodiments, the visual data may at least characterize an orientation, a field of view and/or a line of sight of a user. The second acquisition device is configured to collect the orientation, the visual field, the line of sight, and so on of human eyes. If the second acquisition device is a rear camera of the electronic device, and the user faces the back of the electronic device, the rear camera tracks the human eyes to determine an object that the human eyes are gazing. If the second acquisition device is a front camera, and the user faces the front of the electronic device, then the front camera tracks the human eyes to determine an object that the human eyes are gazing. For example, when the second acquisition device is the front camera of the electronic device, and the user faces the front of the electronic device, if the user is shopping, the eyes are watching a jewelry store, and the second acquisition device may capture the orientation, the visual field or line of sight, etc., of the user, to determine the object of interest to the user.

In Step S203, the electronic device may determine a target object according to the visual data and the media data. In certain embodiments, the process in Step 203 may include: acquiring visual focus data according to the visual data, and determining an object associated with the media data that matches the visual focus data as the target object.

In certain embodiments, the process in Step 203 may be implemented through two methods. In the first method, the electronic device may determine a plurality of candidate objects associated with the media data. The candidate objects are objects having associated data; and the target object is determined from the candidate objects.

The first method may be understood as determining an object (candidate object) having associated data from all objects included in the media data, and determining the target object from the candidate object according to the object of interest to the user or the like. For example, the user is shopping, and the media data includes the objects on a commercial street, such as stores, pedestrians, street lamps or landmark buildings. When selecting candidate objects having associated data from the media data, if a store and a landmark building have associated data, and the object in the user's attention has been determined as the store according to the orientation data, the visual field, the line of sight, and so on collected by the second acquisition device, then the store is determined as the target object. In certain embodiments, when displaying the associated data corresponding to the target object that the user wishes to see, an original software may not need to be modified. Instead, only a component for determining the target object needs to be added, thereby improving the efficiency of the software development process.

In the second method, target data may be determined from the media data. The target data is partial data of the media data. The target object is determined from the target data. In certain embodiments, the second method may be understood as the following. First, the electronic device may determine the object that the user may pay attention to, that is, the target data, from the media data. Then the electronic device may determine object that the user actually pays attention to, that is, the target object, from the target data. For example, the user is shopping, and the media data is the objects on a commercial street, such as stores, pedestrians, street lamps or landmark buildings. First, the electronic device may determine, from the media data, the objects that the user may be interested in, such as various stores. Next, according to the orientation, the visual field or the line of sight of the user collected by the second acquisition device, the electronic device may analyze the object that the user pays attention to and determines the jewelry store as the target object from the object data. Thus, by analyzing the object of interest of the user and then determining the target object, the number of objects to be analyzed is reduced, thereby improving the recognition efficiency.

In Step S204, the electronic device may determine associated data corresponding to the target object.

In Step S205, the electronic device may output the associated data, so that the user may simultaneously perceive the target object and the associated data. The associated data may be outputted in two manners. In the first manner, outputting the associated data may be implemented by the electronic device having a display device. The viewable area of the display device may be configured by the following two methods.

In the first method, the display device may be divided into two regions. Region 1 is a viewable area corresponding to a field of view of the user, and Region 2 is a region other than the Region 1 in the display region. Region 1 has a light transmittance greater than or equal to a preset threshold, that is, the light is transmitted though Region 1. Region 2 has a light transmittance less than the preset threshold, that is, the Region 2 is opaque. For example, the preset threshold is 90%, and the transmittance of the Region 1 is greater than 90%, that is, the area is transparent, the user can clearly see the external environment through the area. The light transmittance of the Region 2 is less than 90%. That is, the user cannot clearly see the external environment through Region 2.

In the second method, the display device may be a common display device, and the image in the field of view of the user is transmitted to a transparent component through an optical device (for example, a part of the inner side of the goggles). The area where the transparent component is located is taken as Region 1, and the display area other than the transparent part is taken as the Region 2.

In short, with the first manner, the user may directly see the environment through Region 1. The associated data (i.e., the supplementary information) is displayed by the display device. The user may clearly see the external scene through Region 1 of the display device, and only the data associated with the target object needs to be displayed on the display device. For example, if the user is shopping and the target object is a jewelry store, the user may be able to see the real jewelry store at the same time as the virtual information (i.e., the associated data) of the jewelry store displayed on the display device, for example, the name or business hours of the jewelry store, etc. The virtual information may be displayed above or next to the jewelry store to give the user a better understanding of the jewelry store.

In the second manner, the light transmittance of the display device of the electronic device may be less than a preset threshold, and the media data and associated data corresponding to the target object are displayed. In short, the second manner is to display the associated data corresponding to the external environment and the target object on the display device in the form of an image. For example, if the user cannot see an external view through the display device, the media data and the associated data corresponding to the target object are required be displayed on display device. For example, the user is shopping, the media data contains the objects on the commercial street. The target object is a jewelry store, and the display device may display the scene that the user sees on commercial street and the virtual information (i.e., associated data) of the jewelry store.

In certain embodiments, by acquiring the data associated with human eyes, the object that the human eyes look at is taken as the target object, and the scene having the target object and associated data is displayed, so that the user is provided with the associated data of the object in the user's attention. This approach does not bring redundant information, while allowing the user to clearly see the information they want to know.

In certain other embodiments, Step S204, that is, determining the associated data corresponding to the target object, may be implemented by the following steps.

In Step S241: the electronic device may acquire attributes of the target object and generate a list of attributes. The attributes of the target object may be the name or utility of the target object, etc. For example, the target object may be a barbecue restaurant, the attributes may be the name of the restaurant, the location, the menu, the floor space, the gender of the owner, and so on.

In Step S242, the electronic device may determine an attribute from the attribute list that satisfies a first preset condition, and use the associated data corresponding to the attribute that satisfies the first preset condition as the associated data corresponding to the target object.

In certain embodiments, satisfying the first preset condition may be understood as satisfying the user's needs and being the attribute that the user usually wants to know about. For example, for a barbecue restaurant, the attributes that the user wants to know usually include the restaurant name, the location and the menu, and generally do not include the gender of the owner.

In certain other embodiments, after Step S205, that is, outputting the associated data so that the user may simultaneously perceive the target object and the associated data, the method further includes the following steps:

In Step S21, the electronic device may determine other objects associated with the media data according to the media data and the target object. The other objects refer to objects other than the object associated with the media data target object associated with the media data.

In Step S22: the electronic device may determine a to-be-displayed object that satisfies a second preset condition among the other objects. The second preset condition may be set according to personal needs of a user. For example, for a user who likes to go shopping, the second preset condition may be set as a store for selling goods.

In Step S23: the electronic device may output a prompt message corresponding to the to-be-displayed object. The prompt message may be used to indicate whether to output the associated data of the to-be-displayed object while outputting the associated data corresponding to the target object.

Figure 3:
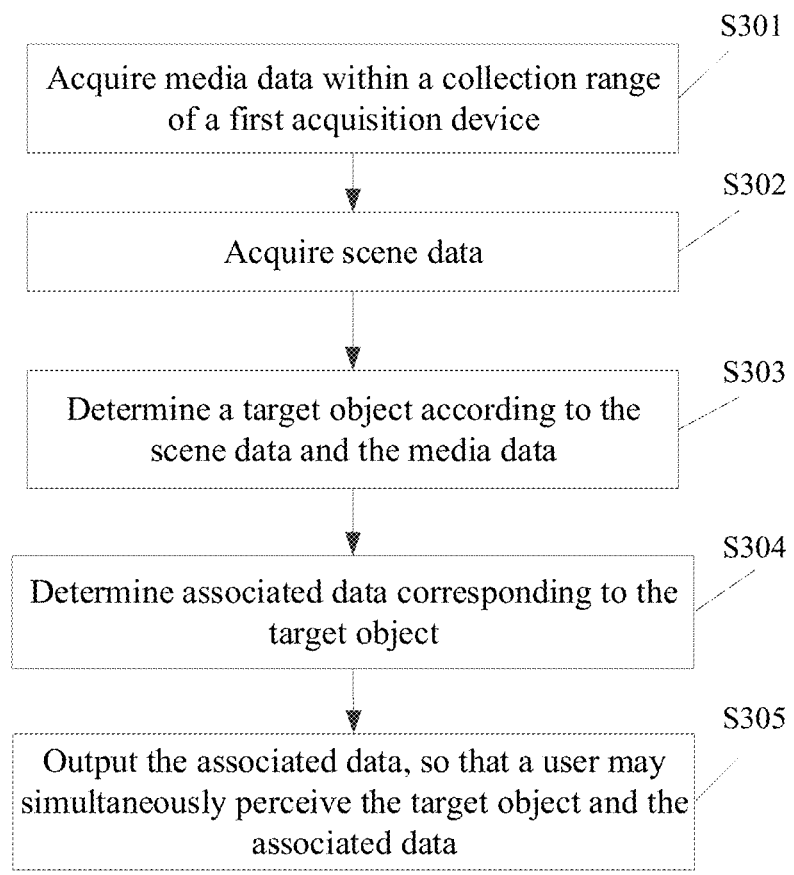
FIG. 3 is a schematic flowchart of a display method according to another embodiment of the present disclosure.

FIG. 3 is a schematic flowchart of a display method according to certain other embodiments of the present disclosure. The method may be applied to an electronic device. As shown in FIG. 3, the method may include the following steps.

In Step S301, the electronic device may acquire media data within a collection range of a first acquisition device.

In Step S302, the electronic device may acquire scene data. In certain embodiments, the electronic device may track human eyes using the acquisition device to acquire the image of the scene where the user is currently located and the object that the user is interested, thereby determining the scene in which the user is currently located, and the scene data may at least represent the scene that the user is in. For example, when the user is shopping, the scene data is shopping; when the user is using a navigation system, the scene data is navigation.

In Step S303, the electronic device may determine a target object according to the scene data and the media data. In certain embodiments, the process in Step S303 may include: acquiring potential focus data according to the scene data, and determining an object associated with the media data that matches the potential focus data as the target object. The potential focus data may be understood as the user's focus data acquired by analyzing the scene in which the user is located.

Determining the target object according to the scene data and the media data may be implemented by two methods. In the first method, a plurality of candidate objects are determined from the media data. The candidate objects are objects having associated data; and the target object is determined from the candidate objects.

The first method may be understood as determining objects having associated data (candidate objects) from all objects included in the media data, and determining the target object from the candidate objects according to the object of interest to the user or the like. For example, the user is shopping, and the media data is the objects on a commercial street, such as stores, pedestrians, street lamps or landmark buildings. When selecting candidate objects having associated data from the media data, if a store and a landmark building have associated data, and the object in the user's attention has been determined as the store according to the orientation data, the visual field, the line of sight, and so on collected by the second acquisition device, then the store is the target object.

In the second method, target data is determined from the media data. The target data is partial data of the media data. The target object is determined from the target data. The second method may be understood as the following. First, the electronic device may determine the object that the user may pay attention to, that is, the target data, from the media data. Then the object that the user pays attention to in reality, that is, the target object, is determined from the target data. For example, the user is shopping, and the media data is the objects on a commercial street, such as stores, pedestrians, street lamps or landmark buildings. First, the electronic device may determine the objects that the user may be interested in from the media data, that is, various stores; then, according to the object that the user looks at, the electronic device may determine which type of stores the user is interested in (assuming a restaurant), then the restaurant is taken as the target object from the target data.

In Step S304, the electronic device may determine associated data corresponding to the target object. For example, if the target object is a store, the associated data may be the square footage of the store, the business hours, or the type of products of the store sells.

In Step S305, the electronic device may output the associated data, so that the user may simultaneously perceive the target object and the associated data. The associated data may be outputted in two manners.

In the first manner, outputting the associated data may be implemented by the electronic device having a display device. If the light transmittance of the display device is greater than or equal to a preset threshold, the display device may display associated data corresponding to the target object. For example, if the user clearly sees an external view through the display device, only the associated data corresponding to the target object needs to be displayed by the display device. For example, when the user is shopping, the target object may be a barbecue restaurant. While the user may see a real view of the barbecue restaurant through the display device, the user may also see the virtual information (i.e., the associated data) of the barbecue restaurant displayed by the display device. For example, the variety of hot drinks and barbecued meats, the business hours, and so on. The virtual information may be displayed in a floating manner above or next to the barbecue restaurant, so that the user may be better informed of the barbecue restaurant.

In the second manner, if the light transmittance of the display device of the electronic device is less than a preset threshold, the display device may display the media data and the associated data corresponding to the target object. For example, the user may not be able to see an external view through the display device. Thus, the display device may display the media data and the associated data corresponding to the target object. For example, if the user is shopping, the media data may include objects on a commercial street. The target object may be a barbecue restaurant, and the display device may display the commercial street that the user sees and the virtual information (i.e., the associated data) of the barbecue restaurant.

In certain embodiments, the electronic device may determine a target object according to a scenario selected by the user. For example, the user may select a navigation mode, then the target object may be a road. The electronic device may then display an image containing the associated data corresponding to the target object. Thus, the electronic device may determine the target object according to the scene in which the user is in, and provide associated data corresponding to the target object, thereby meeting the user's needs and enhancing the user's experience.

Figure 4:
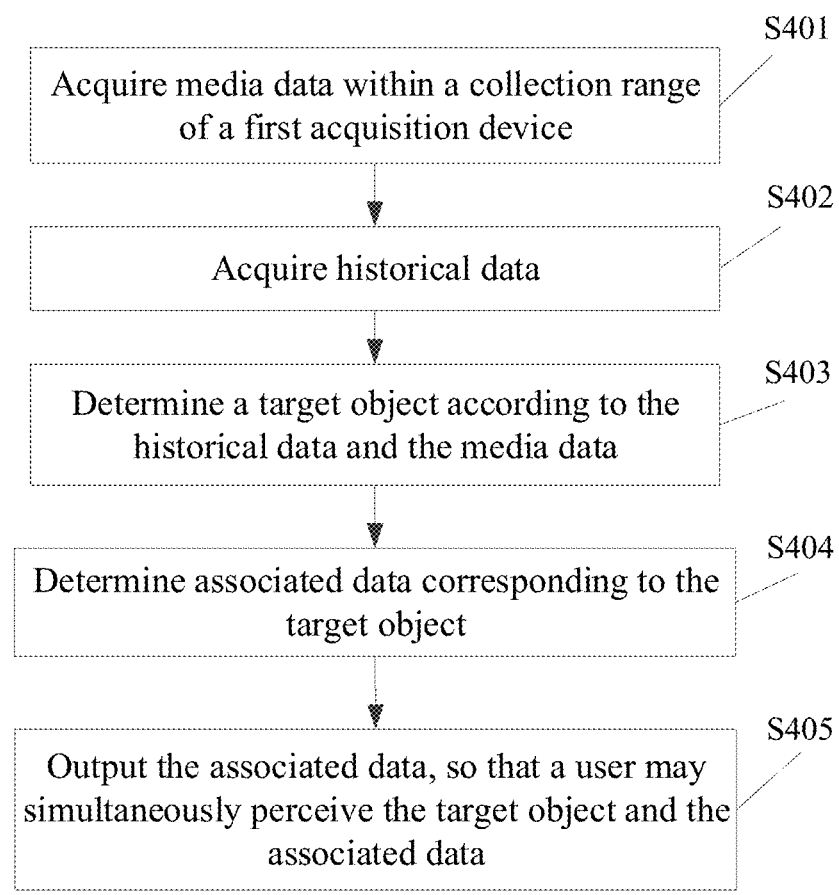
FIG. 4 is a schematic flowchart of a display method according to another embodiment of the present disclosure.

FIG. 4 is a schematic flowchart of a display method according to certain other embodiments of the present disclosure. The method may be applied to an electronic device. As shown in FIG. 4, the method may include the following steps.

In Step S401, the electronic device may acquire media data within a collection range of a first acquisition device.

In Step S402, the electronic device may acquire historical data. In certain embodiments, the electronic device may acquire historical data related to the user's interest using machine learning. The historical data may represent the interest of a user. For example, the electronic device may determine a depth of research a user has toward an interest or a hobby by analyzing the user's hobbies in recent years.

In Step S403, the electronic device may determine a target object according to the historical data and the media data. In certain embodiments, the process in Step S403 may include:

acquiring potential focus data according to the historical data, and determining an object associated with the media data that matches the potential focus data as the target object.

The process in Step S403 may be implemented by two methods. In the first method, a plurality of candidate objects are determined from the media data. The candidate objects are objects having associated data; and a target object may be determined from the candidate objects.

The first method may be understood as determining objects having associated data (candidate objects) from all objects included in the media data, and determining the target object from the candidate objects according to the target of the user's attention. For example, the user may be shopping, and the media data includes objects on a commercial street, such as stores, pedestrians, street lamps or landmark buildings. When selecting candidate objects having associated data from the media data, if a store and a landmark building have associated data, the electronic device may determine the user's interest by analyzing the historical data of the user, and then determine which type of stores the user is interested in according to the user's depth of research in the interest. For example, if the user is a beginning enthusiast of various clothing brands, then an apparel store may be determined as the target object.

In the second method, the electronic device may determine target data from the media data. The target data is partial data of the media data. Then the target object may be determined from the target data. The second method may be understood as the following. First, the electronic device may determine the object that the user may pay attention to, that is, the target data, from the media data. Then the object that the user pays attention to in reality, that is, the target object, is determined from the target data. For example, if the user is shopping, and the media data includes the objects on a commercial street, such as stores, pedestrians, street lamps or landmark buildings. First, the electronic device may determine the objects that the user may be interested in from the media data, for example, various stores. Next, the electronic device may determine the user's interest by analyzing the historical data of the user, and then determine which type of stores the user is interested in according to the user's depth of research in the interest. For example, if the user is an expert of various clothing brands, e.g., the user is a stylist, then an apparel store other than apparel stores that the user is already familiar with may be determined as the target object.

The process of acquiring the potential focus data according to the historical data, and determining the object that matches the potential focus data as the target object may include two scenarios.

In the first scenario, the electronic device may determine the user's interests by analyzing the user's historical data through machine learning. Next, if the user's depth of research of an interest reaches a second level of interest, the electronic device may display associated data corresponding to the target object that corresponds to the second level of interest.

In certain embodiments, the interest level may be determined by the resources the user invested in the interest area. The invested resource may include a time resource or a data resource. The data resource may be data acquired in the interest area by the user from different electronic devices and through different channels. The second level of interest may indicate that the user is a long-time enthusiast of the interest. When the time resource and data resource the user has invested in the interest area meet a first preset threshold, it may be determined that the user's depth of research for the interest reaches the second level of interest. For example, the time resource invested by the user in an interest area is more than ten years, and the data resource invested includes thousands of pieces of information related to the interest collected through network devices by the user, it may be determined that the user's depth of research for the interest reaches the second level of interest.

In certain embodiments, when the user's depth of research in the interest reaches the second level of interest, it may be understood that the user is a long-time enthusiastic of the interest. When determining the target object, the user's interest may be selectively avoided, since the user likely already has the associated data corresponding to the displayed object.

In the second scenario, the electronic device may determine the user's interests by analyzing the user's historical data through machine learning. Next, if the user's depth of research in the interest reaches a first level of interest, but does not reach the second level of interest, the associated data corresponding to the target object that corresponds to the first level of interest may be displayed for the user.

In certain embodiments, when the time resource and data resource the user has invested in the interest meet a second preset threshold, it may be determined that the user's depth of research in the interest reaches the first level of interest. The second preset threshold may be lower than the first preset threshold.

In certain embodiments, the first level of interest may indicate that the user is a beginning enthusiast of the interest, and the second level of interest may indicate that the user is a long-time enthusiast of the interest. Therefore, the first level of interest is a lower level compared to the second level of interest. When the user's depth of research in the interest reaches the first level of interest, but does not reach the second level of interest, it may be understood that the user is a beginning learner of the interest. In this scenario, an object related to the user's interest may be determined as the target object.

In Step S404, the electronic device may determine associated data corresponding to the target object.

In Step S405, the electronic device may output the associated data, so that a user may simultaneously perceive the target object and the associated data. The associated data may be outputted in two manners.

In the first manner, outputting the associated data may be implemented by the electronic device having a display device. If the light transmittance of the display device is greater than or equal to a preset threshold, the display device may display the associated data corresponding to the target object. For example, if the user can clearly see an external view through the display device, only the associated data corresponding to the target object needs to be displayed by the display device. For example, if the user is shopping and the target object is an apparel store, the user may be able to see the real view of the apparel store at the same time as the virtual information (i.e., the associated data) of the apparel store displayed on the display device, e.g., the business hours, the styles of the clothing, etc. The virtual information may be displayed in a floating manner above or next to the apparel store, so that the user may be better informed of the apparel store.

In the second manner, if the light transmittance of the display device of the electronic device is less than a preset threshold, the display device may display the media data and the associated data corresponding to the target object. For example, the user may not be able to see an external view through the display device, the display device may display the media data and the associated data corresponding to the target object. If the user is shopping, the media data may include the objects on a commercial street. The target object may be an apparel store, and the display device may display the commercial street that the user sees and the virtual information (i. e., the associated data) of the apparel store.

In certain embodiments, the electronic device may determine the user's interest by analyzing the historical behavior of the user, and then determine the target object and display the image with the associated data corresponding to the target object. Thus, by accurately analyzing the user's interests and hobbies, the electronic device may be able to determine the target object according to the user's interest. The user may be able to see the associated data corresponding to the target object, bringing the user information as well as pleasure.

Figure 5A:
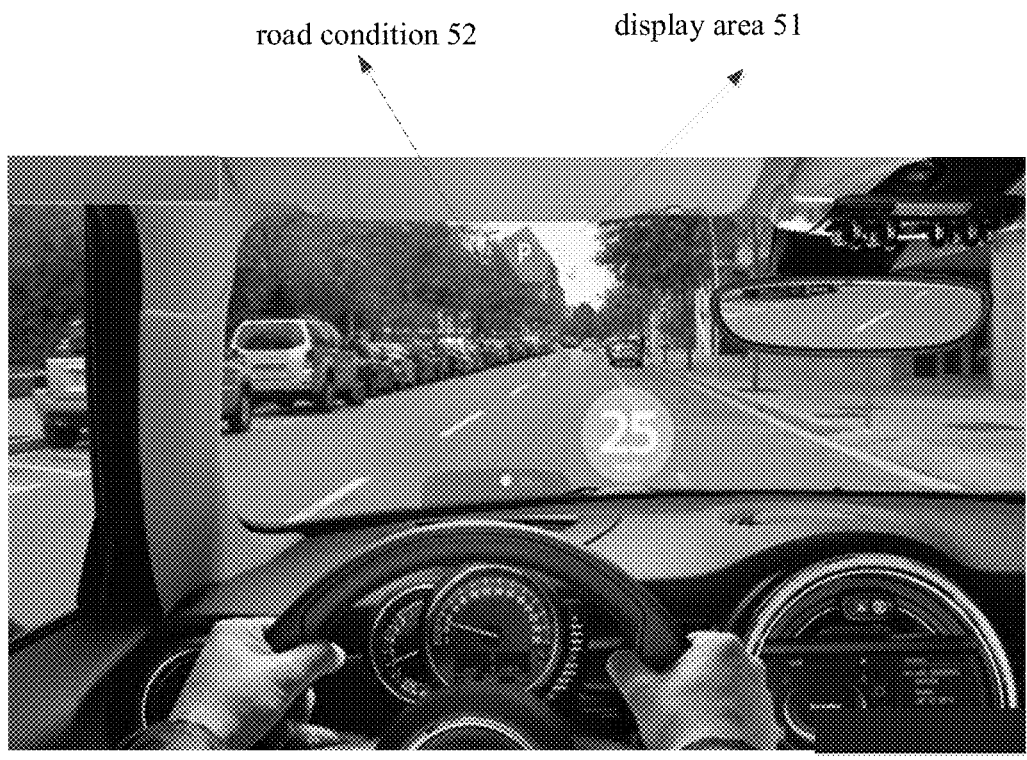
FIG. 5A is a schematic diagram of an application scenario of a display method according to an embodiment of the present disclosure.

The present disclosure provides a display method according to certain embodiments. The method may be applied to an electronic device. The electronic device may include a holding device for maintaining a relative positional relationship between the electronic device and at least a part of the user's body. The holding device may include a head-mounted holding device for maintaining a relative positional relationship between the electronic device and the user's head, so that when the head-mounted holding device is being used, a viewable area is within the line of sight of the user, and the user's line of sight is located in the collection range of the sensors of the acquisition device. For example, the user's eyes may be located within the collection range of the sensors of the acquisition device of the electronic device for detecting the line of sight, that is, the acquisition device of the electronic device matches the line of sight of the user. By tracking the eye movements, the electronic device may determine the object that the user is looking at, and display the supplementary information (associated data) corresponding to the target object in the visual filed of the user. As shown in FIG. 5A, a user may navigate using the electronic device. The electronic device may be a smart helmet, smart glasses, or the like, and the electronic device may display a road condition 52 ahead of the user and supplementary information of the road condition in the visual field of the user. In the display area 51, for example, the road ahead is under construction, and the virtual supplementary information (construction signs, etc.) of the road under construction is displayed in front of the user in the display area 51, so that the user may clearly understand the road condition ahead.

Figure 5B:
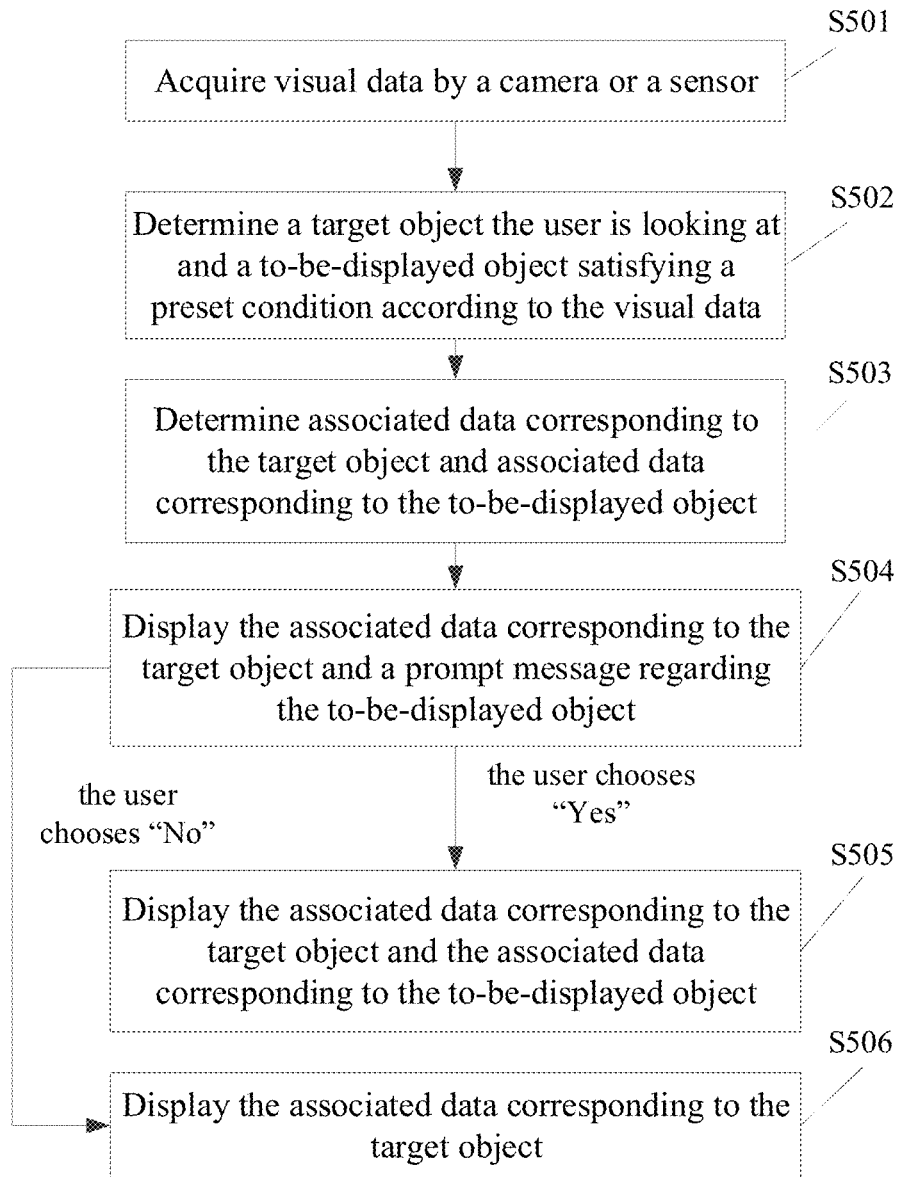
FIG. 5B is a schematic flowchart of a process displaying associated data according to an embodiment of the present disclosure.

FIG. 5B is a schematic flowchart of a process displaying associated data according to certain embodiments of the present disclosure. As shown in FIG. 5B, the method may include the following steps.

In step S501, the electronic device may acquire visual data by a camera or a sensor. In certain embodiments, human eyes are tracked by a camera or a sensor in the electronic device to acquire visual data. The visual data may at least characterize an orientation, a field of view and/or a line of sight of a user.

In Step S502: the electronic device may determine a target object the user is looking at and a to-be-displayed object satisfying a preset condition according to the visual data. In certain embodiments, artificial intelligence (AI) algorithms may be used to analyze human eye activity, that is, the visual data, to determine the object that the user is looking at, i.e., the target object. The to-be-displayed object that satisfies the preset condition may be an object that the user wishes to pay attention to in addition to the target object within the user's field of view. For example, if the target object is a jewelry store, the user may also wish to pay attention to clothing matched with the jewelry, so that an apparel store may be a to-be-displayed object.

In Step S503, the electronic device may determine associated data corresponding to the target object and associated data corresponding to the to-be-displayed object. In certain embodiments, the associated data corresponding to the target object may be determined according to the type of the target object. For example, the target object may be a building, and the associated data may be a name, a location, a height, or a architect of the building.

In Step S504, the electronic device may display the associated data corresponding to the target object and a prompt message regarding the to-be-displayed object. The prompt message may be used for the user to indicate whether to output the associated data of the to-be-displayed object while outputting the associated data corresponding to the target object. For example, the prompt message may ask whether to display the associated data of an apparel store. If the user selects "Yes", the associated data of the to-be-displayed object is displayed, and the process proceeds to step S505. If the user selects "No", the electronic device does not display the associated data of the to-be-displayed object, and the process proceeds to step S506.

In Step S505, the electronic device may display the associated data corresponding to the target object and the associated data corresponding to the to-be-displayed object. In certain embodiments, the user is enabled to simultaneously perceive the target object, the associated data corresponding to the target object, the to-be-displayed object, and the associated data of the to-be-displayed object.

In Step S506, the electronic device may display the associated data corresponding to the target object. In certain embodiments, the user may simultaneously perceive the target object and the associated data corresponding to the target object.

Figure 6A:
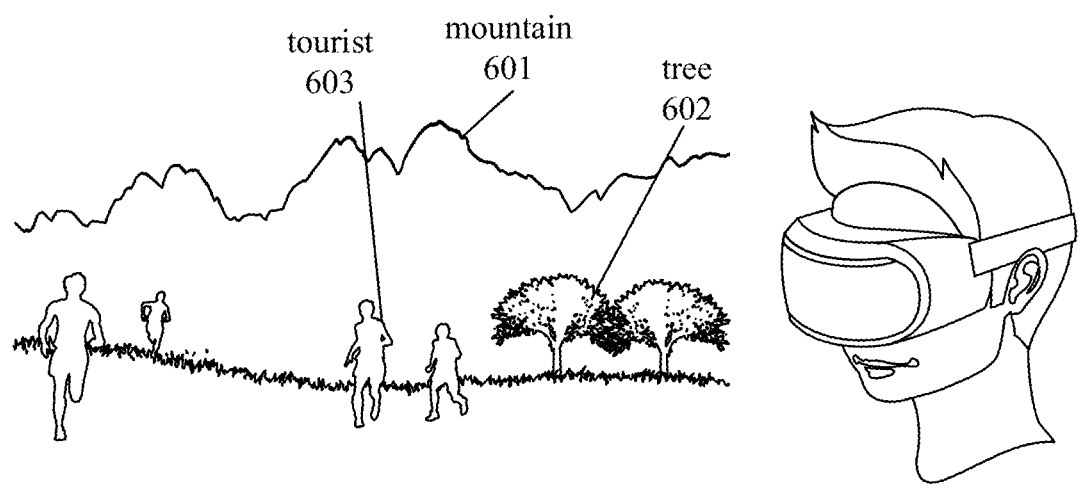
FIG. 6A is a schematic diagram of a scenario for showing a real scene according to an embodiment of the present disclosure.
Figure 6B:
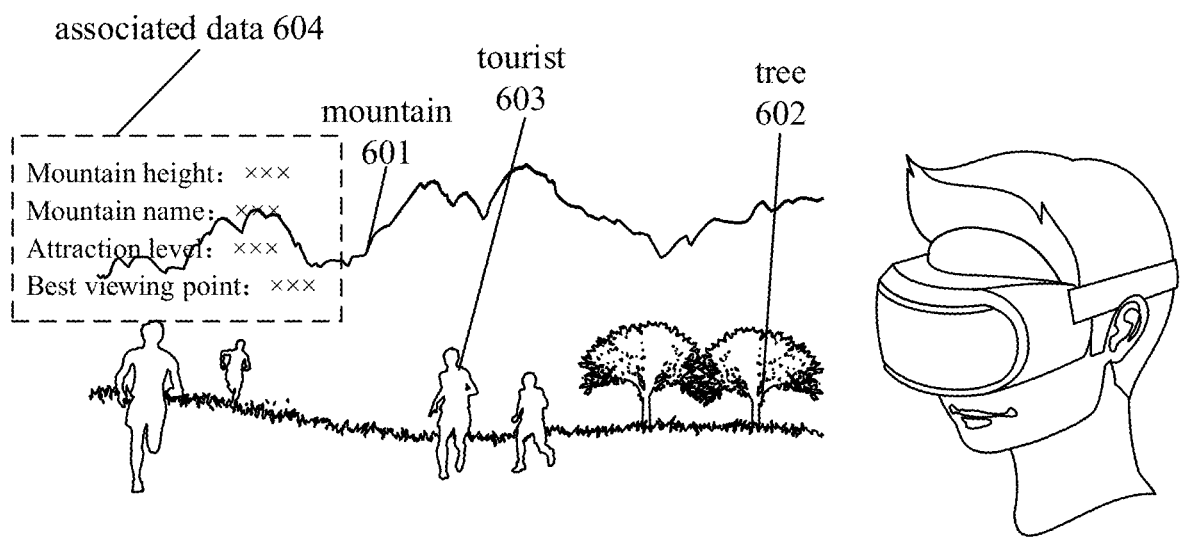
FIG. 6B is a schematic diagram of a scenario for displaying data associated with a real scene and target object according to an embodiment of the present disclosure.
Figure 6C:
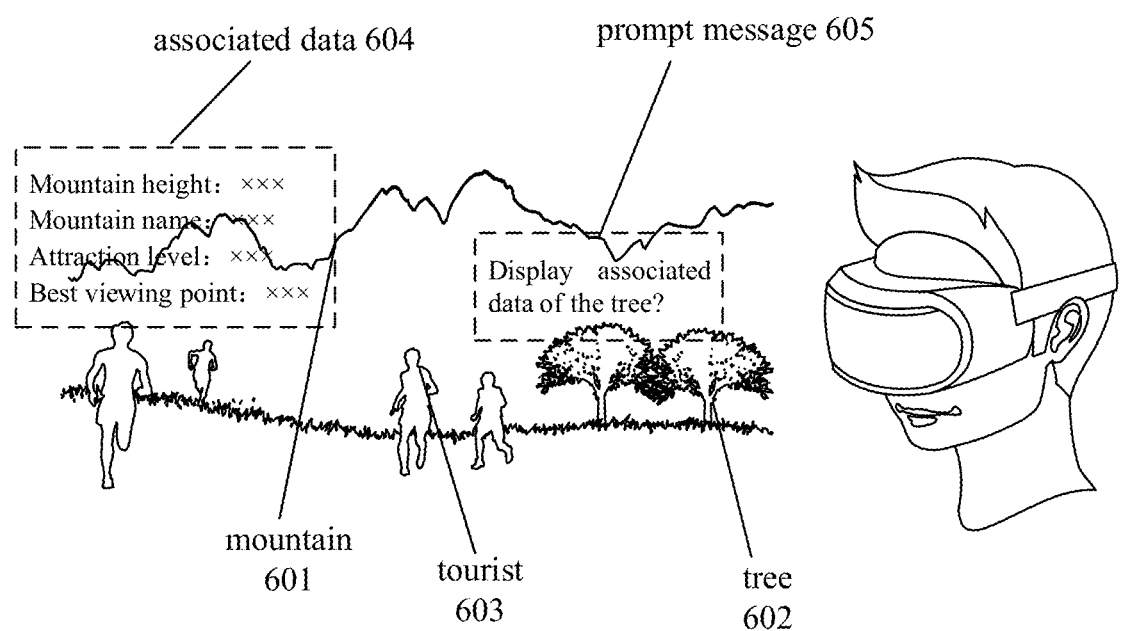
FIG. 6C is a schematic diagram of a scenario for presenting information according to an embodiment of the present disclosure.
Figure 6D:
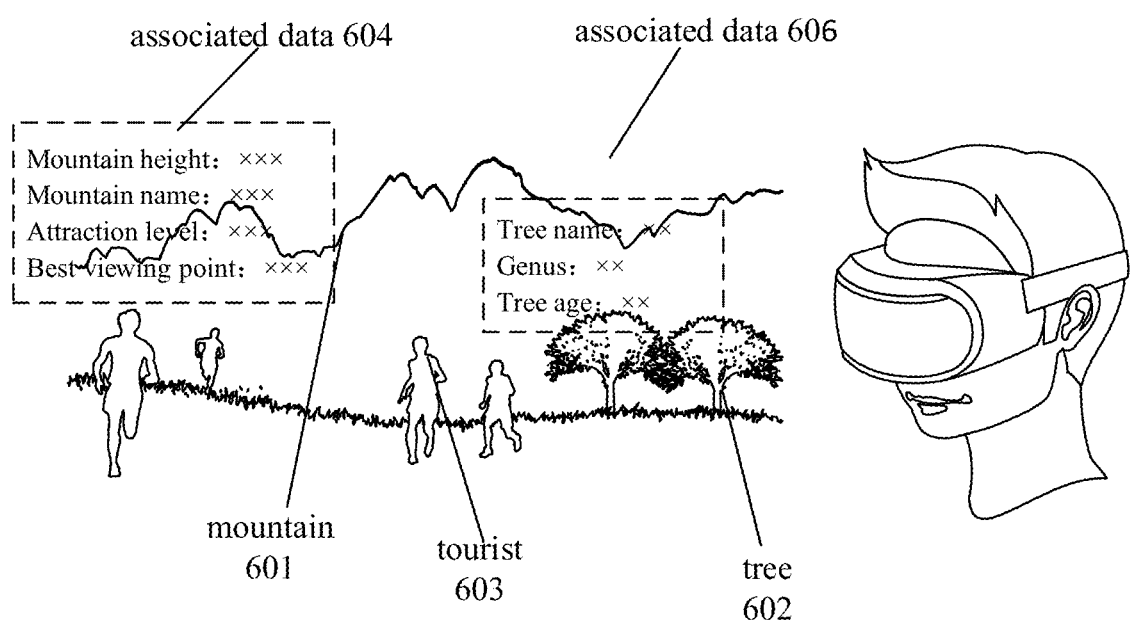
FIG. 6D is a schematic diagram of a scenario for presenting associated data of a real scene and a plurality of target object according to an embodiment of the present disclosure.

FIG. 6A is a diagram showing a real scene according to certain embodiments of the present disclosure. As shown in FIG. 6A, a user is wearing a pair of smart glasses according to the display method of the present disclosure. For example, the user may be a travel enthusiast. Before activating the smart glasses, the user may see a real scene of a scenic spot, as shown in FIG. 6A. The real scene may include trees 602, mountains 601 and tourists 603. When the user activates the smart glasses, the smart glasses may determine that the user's attention is on the mountain by tracking the user's eyes, and present the associated data 604 of the mountain 601, including, for example, "Height of the mountain: xxx", "Name of the mountain: xxx", "Attraction level: xxx", "Best view point: xxx", etc., to the user. The user may see a scene as shown in FIG. 6B, including the real scene ahead including the trees, 602, mountains 601 and tourists 603, as well as the associated data 604 of the mountain 601. As the object in the user's attention changes, the image and associated data presented to the user may also change. In order to improve the user's experience, the smart glasses may determine an additional object, that is, a to-be-displayed object the user may want to learn about. For example, the user may want to know the variety of the trees encountered on the way climbing a mountain. The smart glasses may send a prompt message to ask the user whether the associated data 606 of the tree 602 is to be displayed. As shown in FIG. 6C, on the screen where the user may see the real scene and the associated data 604 of the mountain 601, a prompt message 605 "Do you want to display the associated data of the tree?" is displayed. If the user selects "Yes", the associated data 606 of the tree 602 may be displayed, for example, as "Name of the tree: xxx", "Genus of the tree: xxx", and "Tree age: xxx", etc. Thus, the smart glasses allow the user to see the associated data 604 of the mountain 601 as well as the associated data 606 of the tree 602. As shown in FIG. 6D, the user is presented with the associated data 604 of the mountain 601 and the associated data 606 of the tree 602.

Figure 7:
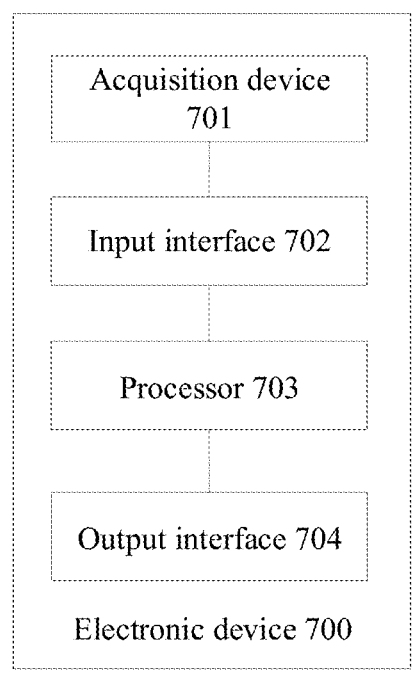
FIG. 7 is a schematic structural diagram of an electronic device according to an embodiment of the present disclosure.

In another aspect of the present disclosure, an electronic device is provided according to certain embodiments. FIG. 7 is a schematic structural diagram of an electronic device according to certain embodiments of the present disclosure. As shown in FIG. 7, the electronic device 700 may include an acquisition device 701, an input interface 702, a processor 703, and an output interface 704.

The acquisition device 701 is configured to collect media data. The input interface 702 is configured to input the media data. The processor 703 is configured to determine the target object from the media data and associated data corresponding to the target object. The output interface 704 is configured to output the associated data, so that the user may simultaneously perceive the target object and the associated data.

In certain embodiments, the electronic device may further include a display device. The display device is configured to display the associated data corresponding to the target object if the transmittance of the display device is greater than or equal to a preset threshold; or to display the media data and the associated data corresponding to the target object if the transmittance of the display device is below a preset threshold.

In certain other embodiments, the processor 703 is configured to acquire visual data collected by a second acquisition device. The visual data may at least characterize an orientation, a field of view and/or a line of sight of a user. The processor 703 is also configured to determine a target object according to the media data and the visual data. The process of determining the target object according to the visual data and the media data may include acquiring visual focus data according to the visual data, and determining an object associated with the media data that matches the visual focus data as the target object.

In certain other embodiments, the processor 703 is configured to acquire scene data. The scene data may represent the scene that the user is in. The processor 703 is further configured to determine the target object according to the scene data and the media data. Determining the target object according to the scene data and the media data may include: acquiring potential focus data according to the scene data, and determining an object associated with the media data that matches the potential focus data as the target object.

In certain other embodiments, the processor 703 is configured to acquire historical data. The historical data may represent the interest of a user. The processor 703 is configured to determine the target object according to the historical data and the media data. Determining the target object according to the historical data and the media data may include: acquiring the potential focus data according to the historical data, and determining the object that matches the potential focus data as the target object.

In certain other embodiments, the processor 703 is configured to determine a plurality of candidate objects associated with the media data, where the candidate objects are objects having associated data; and determine the target object from the candidate objects. Alternatively, the processor 703 may be configured to determine target data from the media data, where the target data is partial data of the media data; and determine the target object from the target data.

In certain other embodiments, the processor 703 is configured to acquire attributes of the target object and generate a list of attributes; determine an attribute from the attribute list that satisfies a first preset condition; and use the associated data corresponding to the attribute that satisfies the first preset condition as the associated data corresponding to the target object.

In certain other embodiments, the processor 703 is configured to determine other objects associated with the media data according to the media data and the target object; determine a to-be-displayed object that satisfies a second preset condition among the other objects; output a prompt message corresponding to the to-be-displayed object, wherein the prompt message may be used for the user to indicate whether to output the associated data of the to-be-displayed object while outputting the associated data corresponding to the target object.

In the embodiments of the present disclosure, if the foregoing display method is implemented in the form of a software function module and sold or used as a stand-alone product, it may also be stored in a computer readable storage medium. Based on such understanding, the technical solution according to the embodiments of the present disclosure may be embodied in the form of a software product in essence or in the form of a software product stored in a storage medium, including a plurality of instructions. A computing device, for example, a personal computer, a server, or a network device, etc., may be used to perform all or part of the methods described in the various embodiments of the present disclosure. The foregoing storage medium may include a medium that can store program codes, such as a USB flash drive, a mobile hard disk, a read-only memory (ROM), a magnetic disk, or an optical disk. Thus, embodiments of the present disclosure are not limited to any particular combination of hardware and software.

Correspondingly, certain embodiments of the present disclosure provide an electronic device. The electronic device may include: a memory and a processor. The memory may be used to store a program; and the processor may be configured to execute the program stored in the memory to perform: acquiring media data within a collection range of a first acquisition device; determining the target object associated with the media data and the associated data corresponding to the target object, wherein the target object may be a part of a plurality of candidate objects associated with the media data that may have corresponding associated data; and outputting the associated data, so that the user may simultaneously perceive the target object and the associated data.

The descriptions of the foregoing storage medium and the foregoing device are similar to the description of the foregoing method, and provide similar advantages as the method embodiments. For technical details not described in the storage medium and device embodiments of the present disclosure, please refer to the description of the method embodiments of the present disclosure.

In the several embodiments provided by the present disclosure, it should be understood that the disclosed system, apparatus, and method may be implemented in other manners. The foregoing device embodiments are merely illustrative. For example, the division of the units is only a logical function division. In actual implementation, there may be other division manners, for example: multiple units or components may be combined, or integrated into another system; some features may be omitted or not executed. In addition, the coupling or communicative connection of various components shown or discussed may be indirect coupling or communicative connection through certain interfaces, devices or units, and may be electrical, mechanical or in other forms.

The foregoing separate components may or may not be physically separated, and the displayed components may or may not be physical units. They may be located in one place or distributed to multiple network units. Some or all of the units may be used to implement the technical solutions according to the application.

In addition, each functional unit in the embodiments of the present disclosure may be integrated into one processing unit, or each unit may be separately used as a stand-alone unit, or two or more units may be integrated into one unit. The foregoing integration may be implemented in the form of hardware or in the form of hardware plus software functional units.

It may be understood by those skilled in the art that all or part of the steps of implementing the foregoing method embodiments may be performed by hardware related to program instructions, and the foregoing program may be stored in a computer readable storage medium, and when executed, the program performs the steps of the foregoing method embodiments. The storage medium may include: a variety of removable storage devices, a read-only memory (ROM), a random-access memory (RAM), a magnetic disk, or an optical disk in which program codes may be stored.

Alternatively, if the foregoing integrated unit is implemented in the form of software function modules and sold or used as a stand-alone product, it may be stored in a computer readable storage medium. Based on such understanding, the technical solution according to the embodiments of the present disclosure may be embodied in the form of a software product in essence or in the form of a software product stored in a storage medium, including a plurality of instructions to cause a computer device (which may be a personal computer, a server, or a network device, etc.) to perform all or part of the methods described in various embodiments of the present disclosure. The foregoing storage medium may include various media that may store program codes, such as a mobile storage device, a ROM, a RAM, a magnetic disk, or an optical disk.

The foregoing description includes specific embodiments of the present disclosure. However, the scope of the present disclosure is not limited thereto, and a person skilled in the art may conceive changes or substitutions without excessive creative efforts. These changes or substitutions are within the scope of the present disclosure.

What is claimed is:

1. A display method comprising:
acquiring media data within a collection range of a first acquisition device;
determining a target object associated with the media data, including:
determining an interest of a user by analyzing historical data of the user acquired through different devices and different channels; and
determining whether an object related to the interest is the target object by comparing a depth of research of the user in the interest with a first level of interest and a second level of interest, the first level of interest indicating the user is a beginning enthusiast of the interest and the second level of interest indicating the user is a long-time enthusiast of the interest, and the first level of interest being a level lower than the second level of interest, including:
in response to determining that the depth of research of the user in the interest reaches the first level of interest but does not reach the second level of interest, determining the object related to the interest as the target object; and
in response to determining that the depth of research of the user in the interest reaches the second level of interest, determining the object related to the interest is not the target object;
determining associated data corresponding to the target object; and
outputting the associated data corresponding to the target object to the user.

2. The method according to claim 1, wherein determining the target object associated with the media data further comprises:
acquiring visual data collected by a second acquisition device, the visual data characterizing at least one of: a user orientation, a user field of view, or a user line of sight;
determining visual focus data according to the visual data; and
identifying an object associated with the media data that matches the visual focus data as the target object.

3. The method according to claim 1, wherein determining the target object associated with the media data further comprises:
acquiring scene data, the scene data representing a scene in which the user is located;
determining potential focus data according to the scene data; and
identifying an object associated with the media data that matches the potential focus data as the target object.

4. The method according to claim 1, wherein determining the target object associated with the media data further comprises:
acquiring the historical data;
determining potential focus data according to the historical data; and
identifying an object associated with the media data that matches the potential focus data as the target object.

5. The method according to claim 1, wherein determining the target object associated with the media data further comprises:
determining a plurality of candidate objects associated with the media data, the candidate objects being objects having associated data; and
determining the target object from the candidate objects.

6. The method according to claim 1, wherein determining the target object associated with the media data further comprises:
determining target data associated with the media data, the target data being partial data of the media data; and
determining the target object according to the target data.

7. The method according to claim 1, wherein determining the associated data corresponding to the target object comprises:
acquiring a list of attributes of the target object;
identifying an attribute satisfying a first condition from the list of attributes; and
determining associated data corresponding to the identified attribute as the associated data corresponding to the target object.

8. The method according to claim 1, further comprising:
determining a list of additional objects associated with the media data;
determining a to-be-displayed object that satisfies a second condition from the list of additional objects;

outputting a prompt message to inquire whether to display associated data of the to-be-displayed object; and outputting the associated data of the to-be-displayed object with the associated data of the target object when receiving an affirmative answer to the prompt message.

9. The method according to claim 1, further comprising:
determining the depth of research of the user in the interest according to resources the user invested in an area of the interest, the resources including time resource and data resource acquired in the area of interest by the user from the different devices and through the different channels;

in response to the time resource and the data resource meeting a first preset threshold, determining that the depth of research of the user in the interest reaches the second level of interest; and in response to the time resource and the data resource meeting a second preset threshold, determining that the depth of research of the user in the interest reaches the first level of interest, the first level of interest being a level lower than the second level of interest.

10. An electronic device comprising:
a memory storing a set of instructions; and
a processor configured to execute the set of instructions to perform:
acquiring media data within a collection range of a first acquisition device;
determining a target object associated with the media data, including:
determining an interest of a user by analyzing historical data of the user acquired through different devices and different channels; and
determining whether an object related to the interest is the target object by comparing a depth of research of the user in the interest with a first level of interest and a second level of interest, the first level of interest indicating the user is a beginning enthusiast of the interest and the second level of interest indicating the user is a long-time enthusiast of the interest, and the first level of interest being a level lower than the second level of interest, including:
in response to determining that the depth of research of the user in the interest reaches the first level of interest, but does not reach the second level of interest, determining the object related to the interest as the target object; and
in response to determining that the depth of research of the user in the interest reaches the second level of interest, determining the object related to the interest is not the target object;
determining associated data corresponding to the target object; and
outputting the associated data corresponding to the target object to the user.

11. The electronic device according to claim 10, wherein the processor is further to perform:
acquiring visual data collected by a second acquisition device, the visual data characterizing at least one of: a user orientation, a user field of view, or a user line of sight;
determining visual focus data according to the visual data; and
identifying an object associated with the media data that matches the visual focus data as the target object.

12. The electronic device according to claim 10, wherein the processor is further to perform:

acquiring scene data, the scene data representing a scene in which the user is located;
determining potential focus data according to the scene data; and
identifying an object associated with the media data that matches the potential focus data as the target object.

13. The electronic device according to claim 10, wherein the processor is further to perform:
acquiring the historical data;
determining potential focus data according to the historical data; and
identifying an object associated with the media data that matches the potential focus data as the target object.

14. The electronic device according to claim 10, wherein the processor is further to perform:
determining a plurality of candidate objects associated with the media data, the candidate objects being objects having associated data; and
determining the target object from the candidate objects.

15. An electronic device, comprising:
a first acquisition device configured to collect media data;
a processor, configured to:
determine a target object associated with the media data by:
determining an interest of a user by analyzing historical data of the user acquired through different devices and different channels; and
determining whether an object related to the interest is the target object by comparing a depth of research of the user in the interest with a first level of interest and a second level of interest, the first level of interest indicating the user is a beginning enthusiast of the interest and the second level of interest indicating the user is a long-time enthusiast of the interest, and the first level of interest being a level lower than the second level of interest, including:
in response to determining the depth of research of the user in the interest reaches the first level of interest, but does not reach the second level of interest, determining the object related to the interest as the target object; and
in response to determining that the depth of research of the user in the interest reaches the second level of interest, determining the object related to the interest is not the target object and
determine associated data corresponding to the target object; and
a display device configured to output the associated data corresponding to the target object to the user.

16. The electronic device according to claim 15, wherein:
the display device comprises a viewable area having a light transmittance greater than or equal to a transmittance threshold; and
the display device is configured to display the associated data corresponding to the target object.

17. The electronic device according to claim 15, wherein:
the display device comprises a viewable area having a light transmittance less than a transmittance threshold; and
the display device is configured to display the media data and the associated data corresponding to the target object.

18. The electronic device according to claim 15, wherein:
the electronic device further comprises a second acquisition device configured to collect visual data, the visual data characterizing at least one of: a user orientation, a user field of view, or a user line of sight; and the processor is configured to determine the target object according to the visual data.

19. The electronic device according to claim 18, further comprising a holding device for maintaining a relative positional relationship between the electronic device and a portion of a body of the user.

20. The electronic device according to claim 19, wherein the holding device is a head-mounted holder that maintains a relative positional relationship between the electronic device and a head of the user, so that a viewable area is within a line of sight of the user, and the line of sight of the user is located within a collection range of sensors of the second acquisition device.

* * * * *